United States Patent [19]

Mestanza

[11] Patent Number: 6,124,422
[45] Date of Patent: Sep. 26, 2000

[54] METHOD FOR QUENCHING OF POLYCARBONATE

[75] Inventor: Raphael Mestanza, Saint Riquier es Plains, France

[73] Assignee: General Electric Co., Schenectady, N.Y.

[21] Appl. No.: 09/273,379

[22] Filed: Mar. 22, 1999

[51] Int. Cl.[7] .................................................. C08G 63/02
[52] U.S. Cl. .......................................... 528/198; 528/196
[58] Field of Search ...................... 528/196, 198

[56] References Cited

U.S. PATENT DOCUMENTS 5,210,268  5/1993  Fukuoka et al. .................. 558/270
5,319,066  6/1994  King, Jr. ............................ 528/199
5,713,453  2/1998  Schornhorst et al. ............. 198/380
5,717,057  2/1998  Sakashita et al. ................. 528/198
5,834,615  11/1998  Nishihira et al. ................. 558/274

*Primary Examiner*—Terressa M. Boykin

[57] ABSTRACT

Polycarbonate produced by reaction in a melt of a diaryl carbonate and a dihydric phenol in the presence of a basic catalyst is quenched to reduce the level of residual catalyst by combining the polycarbonate with a powder-free quenching composition. The quenching composition contains an acidic quencher, such as an alkyl tosylate, in a non-powder carrier. The non-powder carrier may be a liquid or a solid, for example in the form of pellets containing or coated with the quencher.

24 Claims, 2 Drawing Sheets

CONVENTIONAL INTERFACIAL

CONVENTIONAL INTERFACIAL

MELT

NO PHOSGENE MELT

METHOD FOR QUENCHING OF POLYCARBONATE

CROSS REFERENCE TO RELATED PATENTS

None

STATEMENT REGARDING FEDERALLY SPONSORED RESEARCH

Not applicable.

BACKGROUND OF THE INVENTION

This application relates to the finishing of polycarbonate using a melt process, and in particular to a method for quenching residual catalyst used in the polycarbonate-forming reaction.

Aromatic polycarbonates are useful in a great many applications because of their desirable physical properties, including strength and optical clarity. There are three processes known for the production of aromatic polycarbonates, which are illustrated in FIG. 1. The conventional interfacial process and the phosgene-based melt process start with the reaction of phosgene with carbon monoxide. The "no phosgene" melt process was developed to eliminate the use of highly toxic phosgene in the reaction process.

Both types of melt processes make use of a diaryl carbonate such as diphenyl carbonate (DPC) as an intermediate, which is polymerized with a dihydric phenol such as bisphenol A (BPA) in the presence of an alkaline catalyst to form a polycarbonate in accordance with the general reaction shown in FIG. 2. This polycarbonate may be extruded or otherwise processed, and may be combined with additives such as dyes and UV stabilizers. In many cases, however, the presence of residual catalyst has a detrimental effect on the quality of the product, leading to poor color, molecular weight or rheological properties. Residual catalyst may also interact with additives, detracting from their efficacy. Thus, it is desirable to reduce the levels of residual catalyst to minimize these interactions. Such reduction is referred to as "quenching."

Commonly assigned U.S. Pat. No. 5,717,057, which is incorporated herein by reference, discloses the use of sulfur-containing acids and acid derivatives such as esters for neutralization of residual alkaline catalyst. The acid or acid derivative is added directly to the polycarbonate product of the polycondensation reaction during post-reaction extrusion and pelletization. As the amount of liquid quencher is extremely low and the amount of quencher is important for the final properties, it is impossible to feed quencher in pure form on an industrial scale. The use of a carrier is needed to maintain the levels of accuracy required.

Quenching of residual alkaline catalyst has been accomplished commercially using n-butyl p-toluenesulfonic acid (a.k.a. n-butyl tosylate) in a powder carrier. The tosylate acts by direct alkylation of the alkaline catalyst, with concomitant degradation of the tosyl moiety. A small amount of liquid quencher is added to a polycarbonate powder dry blend which also contains other additives such as heat stabilizers, UV absorbers, and color stabilizers. Because of the use of a polycarbonate powder, however, this process has the disadvantage of bringing dust into an otherwise dust-free process. Thus, there is room for improvement in the process of making polycarbonates using acidic quenchers. It is an object of the present invention to provide such improvements.

SUMMARY OF THE INVENTION

The invention provides a method for finishing polycarbonate produced by melt condensation of a diaryl carbonate and a dihydric phenol in the presence of a basic catalyst to produce an intermediate polycarbonate composition, comprising the steps of;

(a) combining the intermediate polycarbonate composition with a powder-free quenching composition comprising an acidic quencher in a non-powder carrier; and (b) processing the combination of the intermediate polycarbonate composition and the quenching composition to blend the compositions and quench residual basic catalyst present in the intermediate polycarbonate composition. The quenching composition may be in the form of a liquid or a non-powder solid. A preferred embodiment of the invention makes use of an alkyl tosylate such as n-butyl tosylate as the acidic quencher.

DETAILED DESCRIPTION OF THE INVENTION

Figure 1A:
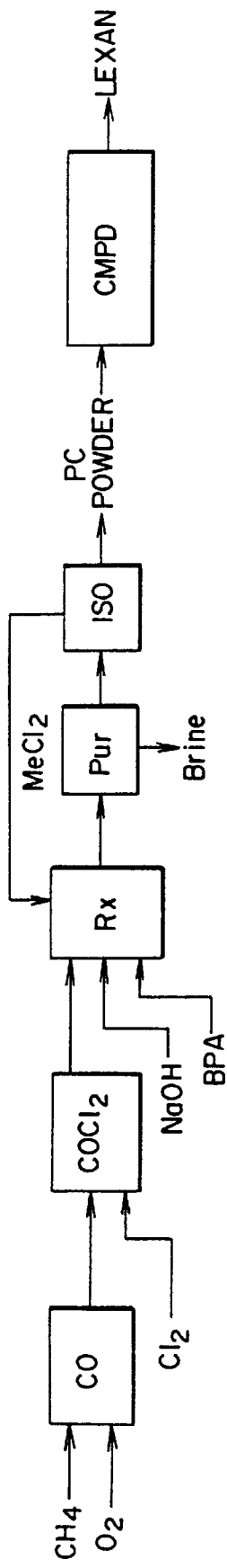
FIG. 1 shows three methods for manufacturing polycarbonates.
Figure 1B:
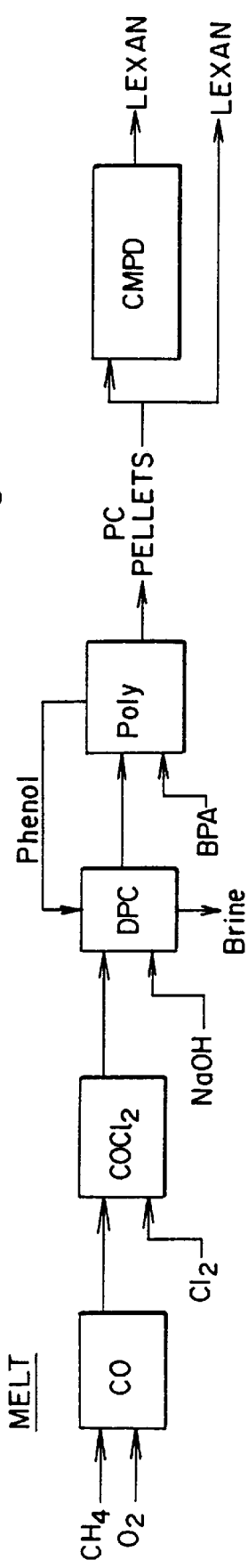
Figure 1C:
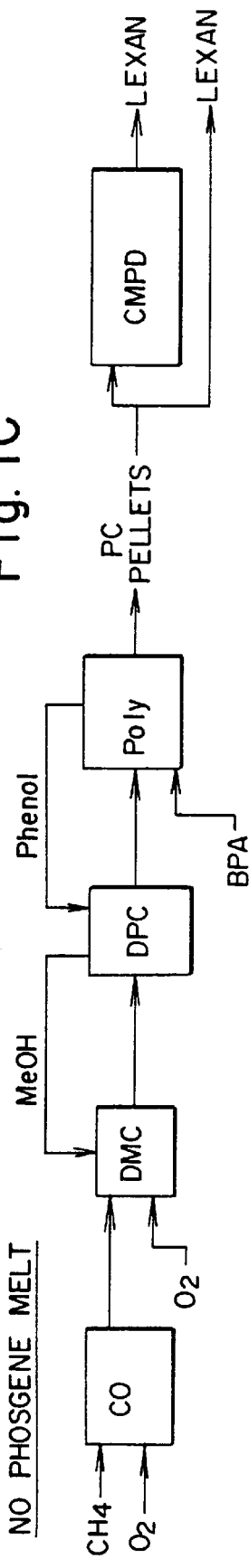
Figure 2:
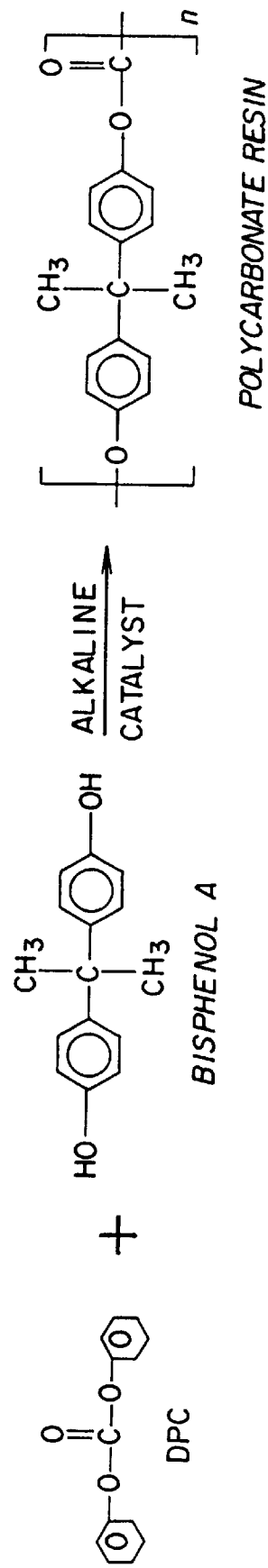
FIG. 2 shows the reaction of a diaryl carbonate and a dihydric phenol to produce a polycarbonate.

In the method of the present invention, residual alkaline catalyst present in a polycarbonate composition formed from the reaction of a diaryl carbonate and a dihydric phenol is quenched using a non-powder quenching composition to provide a polycarbonate composition with improved properties. The method of the invention thus avoids problems associated with the introduction of dust, while providing quenching of residual catalyst with efficiency comparable to that of the known powder-based quenching process.

The method of the invention can be employed as a finishing step in the preparation of polycarbonates where an intermediate polycarbonate composition is formed from the reaction of a diaryl carbonate and a dihydric phenol in the presence of a basic catalyst in a melt. Preparation of polycarbonate compositions using this basic technique are known in the art, for example from U.S. Pat. Nos. 5,717,057 and 5,319,066 which are incorporated herein by reference.

While a preferred diaryl carbonate for use in the method of the invention is diphenyl carbonate, other diaryl carbonates may be used to make specialty polycarbonates. Various methods for synthesis of diaryl carbonates are known, for example from U.S. Pat. Nos. 5,210,268, 5,834,615 and 5,713,453 which are incorporated herein by reference.

A preferred dihydric alcohol for use in the method of the present invention is bisphenol A. Other dihydric alcohols, including those listed in U.S. Pat. No. 5,717,057 may also be used.

Catalysts used in the method of the present invention to form the intermediate composition are basic catalysts such as alkali metal or alkaline earth metal compounds or nitrogen-containing basic compounds which are effective to catalyze the production of polycarbonates by melt condensation of the diaryl carbonate and the dihydric phenol. Any of the known catalysts useful for this purpose may be employed.

The method of the invention provides a finishing step to reduce or eliminate residual catalyst in the polycarbonate product in order to minimize detrimental effects on the properties of the finished product. In accordance with the invention, this finishing step is accomplished by combining the intermediate polycarbonate composition with a powder-free quenching composition comprising an acidic quencher in a non-powder carrier; and processing the combination of the intermediate polycarbonate composition and the quenching composition to blend the compositions and quench residual basic catalyst present in the intermediate polycarbonate composition.

As used herein the term "acidic quencher" refers to an acid or acid derivative (for example an ester or a salt of an acid) which is effective to neutralize the alkaline catalyst used in the polycondensation reaction without generating by-products which impair the physical properties of product polycarbonate. Suitable materials include the sulfur-containing acidic compounds disclosed in U.S. Pat. No. 5,717,057. Preferred acidic quenchers are alkyl tosylates, particularly n-butyl tosylate. Mixtures of acidic quenchers may also be employed.

In a first embodiment of the invention, the powder-free quenching composition that is combined with the intermediate polycarbonate composition is a liquid quenching composition comprising an acidic quencher and a liquid carrier. The liquid carrier should be one which solubilizes the acidic quencher and which is itself soluble in the polycarbonate. A preferred liquid carrier is propylene carbonate. Other liquid carriers which can be utilized include anisole, melted DPC, toluene, mixtures of DPC and anisole, melted pentaerythritol tetrastearate (PETS), and glycerol monostearate (GMS). The liquid powder-free quenching composition may also contain additional additives, including UV stabilizers, heat stabilizers and the like which are added to enhance the properties of the final product. Such additives may also be added separately from the quencher, and additive-containing powders may be compacted to provide a completely powder-free process.

The liquid powder-free quenching composition is combined with molten polycarbonate and mixed, for example using an extruder, to disperse the quenching composition thoroughly. The liquid powder-free quenching composition can be added directly to the polycondensation product, or to remelted polycarbonate pellets which have been formed as an intermediate in the manufacturing process.

In a second embodiment of the invention, solid masterbatch pellets containing the acidic quencher are utilized for introduction of the acidic quencher to the polycarbonate. These masteratch quencher pellets may be formed by pre-compounding a mixture of polycarbonate, the acidic quencher, and optionally other desired additives, and forming pellets.

The quencher pellets may also be formed by compacting a polycarbonate powder masterbatch containing the acidic quencher into pellets. In these two cases, the acidic quencher is dispersed within a polycarbonate matrix. The acidic quencher may also be introduced in coated pellets, i.e., pellets of polycarbonate to which a surface coating of acidic quencher has been applied. In either case, the quencher pellets can be added directly to the polycondensation product, or to remelted polycarbonate pellets which have been formed as an intermediate in the manufacturing process. The quencher pellets formed in this way can be prepared in advance of use, and thus form a separate aspect of the present invention. The amount of quencher incorporated in the pellets is selected to provide the desired amount of quencher (i.e., from about 3 to 5 ppm) to the polycarbonate composition, when the pellets are added at an industrially reasonable rate to the polycarbonate to be finished. In general, this means that the pellets will include at least 0.01% by weight of the acidic quencher, and preferably at least 0.1% by weight of the acidic quencher.

As described in the examples below, test runs were made comparing powder-free liquid quencher compositions and pellet quencher compositions with powdered quencher compositions. To evaluate the efficiency of quenching, the reactivity between polycarbonate and a UV absorber (Cyasorb 5411™, supplied by Cytec) was measured. Since this UV absorber has a reactive OH group, it can react in the presence of residual catalyst with the polycarbonate backbone. The amount of this reaction which occurs can be determined by measuring the UV absorbance due to the UV absorber, and is directly proportional to the amount of residual catalyst. Quantitatively, the amount of reaction can be expressed as %UV Retention=(Amount detected after solvent extraction/ Amount detected after full hydrolysis)×100

The higher the UV retention is, the better. In general, UV retention for unquenched materials is 35 to 50%, while the UV retention for materials to which an acidic quencher has been added is 70 to 100%. Comparable UV retention levels are obtained using powder-free methods in accordance with the invention and the powder-based method described in the background section.

The invention will now be further described with reference to the following, non-limiting examples.

EXAMPLE 1

Experiments on the introduction of acidic quencher using a liquid carrier were performed on a large scale JSW co-rotation twin screw extruder 160 mm at 300° C., with a screw speed of 200 rpm and a throughput of 5300 kg/hr. A polycarbonate powder masterbatch was prepared containing 0.1 wt % heat stabilizer and 0.3 wt % of a UV absorber (Cyasorb 5411), compacted, and introduced into the extruder via a side feeder. Five samples were run, a control sample in which no quencher was added, a reference sample in which n-butyl tosylate quencher was added as part of the powder masterbatch, and three samples in accordance with the invention in which the n-butyl tosylate was added as a 4% solution in propylene carbonate at a rate of between 0.5 and 1.0 kg/hr. The quencher solution was introduced in the extruder before the side feeder via a nozzle.

The results of these experiments are summarized in Table 1. As shown, the efficiency of quenching using the method of the invention is comparable to the reference sample.

TABLE 1

| Sample | Quenching Method | ppm quencher | % UV Retention |
| --- | --- | --- | --- |
| Control | none | 0 | 45 |
| Reference | Powder MB | 3.6 | 79 |
| 1 | Liquid | 2.4 | 65 |
| 2 | Liquid | 3.6 | 81 |
| 3 | Liquid | 4.8 | 78 |

EXAMPLE 2

Solid polycarbonate pellets containing acidic quencher were prepared in the three ways for evaluation.

Precompounded quencher masterbatch pellets (MB 1) were prepared by dry blending of mixture of 100 parts polycarbonate powder and 0.3 parts n-butyl tosylate in a Henschel blender for a few minutes. The dry blended mixture was then compounded in a Leitritz co-rotative twin screw extruder 34 mm at 270° C., 250 rpm and 15 kg/hr. No vacuum was applied during the compounding to avoid volatilization of the quencher After compounding, dry, transparent and natural pellets were obtained, and no processing issues were experienced. Analysis of the pellets by HPLC determined that they contained 1950 ppm n-butyl tosylate and 400 ppm of p-toluene sulfonic acid (also active as a quencher) which was formed from hydrolysis and thermal decomposition of the n-butyl ester.

Compacted pellets (MB2) were prepared by dry blending a mixture of 98 parts polycarbonate powder, 2 parts pentaerythritol tetrastearate (PETS) and 0.3 parts of n-butyl tosylate. The dry blended mixture was compacted in a UMT compactor having a die diameter of 3 mm and a length of 12 mm at 15 kg/hr. The knife was adjusted to obtain regular white cylinders with an average length of 12 mm. PETS is used as a lubricant to minimize heat generation by friction. Formulations containing 1.5 parts PETS were difficult to compact but acceptable. Formulations containing less than 1 part PETS could not be compacted in this apparatus. Analysis of n-butyl tosylate in the MB2 compacted pellets was done by HPLC, and indicated levels of 2990 ppm with excellent consistency (Std. Deviation=46).

Coated pellets (MB3) were prepared in a 150 liter Nauta-Hosokawa conic blender. 90 kg of polycarbonate pellets were introduced into the blender at room temperature and pre-blended for 5 minutes at 300 rpm. While maintaining the blending, 270 gr of n-butyl tosylate (0.3 wt % of the total PC weight) were then air sprayed into the pellets over a period of 2 minutes, creating a mist in the space over the top of the pellets. Blending continued for 10 minutes, during which time the quencher was absorbed by the pellets and the mist disappeared. The resulting pellets were dry, slightly hazy, and have the characteristic odor of the butyl tosylate. HPLC analysis indicated an average amount of quencher as 2500 ppm, suggesting some quencher accumulation on the wall of the blender.

EXAMPLE 3

The pellets prepared in Example 2 were tested for their ability to quench residual catalyst in polycarbonate formulations. Experiments were performed on a large scale in a JSW co-rotative twin screw extruder 160 mm, at 300° C. with a screw speed 200 rpm and a throughput of 5300 kg/hr. A polycarbonate powder masterbatch was prepared containing 0.1 wt % heat stabilizer and 0.3 wt % of a UV absorber (Cyasorb 5411) and introduced into the extruder via a side feeder. Five samples were run, a control sample in which no quencher was added, a reference sample in which n-butyl tosylate quencher was added as part of the powder masterbatch, and three samples in accordance with the invention in which the UV absorber n-butyl tosylate was added in pellets. The quantity of each type of pellet added was adjusted to end up with 3.6 ppm quencher (n-butyl tosylate, or n-butyl tosylate plus p-toluene sulfonic acid) based on the HPLC results. The pellets were introduced via a separated feeder in the side feeder. The purpose of this example was to evaluate the efficiency of the quenching process using the powder-free quencher of the invention. To obtain a completely powder-free process, additive blends are added in compacted rather than powder form.

The results are summarized in Table 2. As shown, the efficiency of quenching using the method of the invention is comparable to the reference sample.

TABLE 2

| Sample | Quencher | % UV Retention |
|---|---|---|
| Control | none | 45 |
| Reference | 3.6 ppm Powder | 79 |
| MB1 (pre-compounded) | 3.6 ppm pellet | 77 |
| MB2 (compacted) | 3.6 ppm pellet | 78 |
| MB3 (coated) | 3.6 ppm pellet | 81 |

EXAMPLE 4

Several formulations of pellets were prepared according to the method described in Example 2 and tested for their quenching ability of residual catalysts in polycarbonate. Experiments were performed on a 65 mm JSW co-rotative twin screw extruder, at 300° C. with a screw speed of 250 rpm and a throughput rate of 500 kg/h. Three different formulations of compacted masterbatches (neat, 1X3 and LS2) were prepared and introduced into the extruder via a side feeder.

The neat resin composition used in the trial was 97.7% polycarbonate powder, 2% release agent, 0.3% quencher. The amount of masterbatch used, with respect to polycarbonate was 0.11%.

1X3 refers to polycarbonate grades covering a viscosity range from IV=0.355 to 0.53 dl/g, which contain a specific additive package used for application which require stabilization for ultraviolet radiation. The composition used in the trial was 0.79% release agent, 39.62% heat stabilizer, 59.46% UV stabilizer and 0.13% quencher. The amount of masterbatch used, with respect to polycarbonate was 0.26%.

LS2 refers to polycarbonate grades used in lenses and similar application. The composition used in the trial was 0.79% release agent, 18.85% heat stabilizer A, 4.7% heat stabilizer B, 70.83% UV stabilizer, 4.7% hydrolytic stabilizer and 0.09% quencher. The amount of masterbatch used, with respect to polycarbonate was 0.43%.

Measurement of quenching efficiency was conducted by mean of the standard UV retention test for samples 3, 4 and 5 (those containing UV stabilizer). Viscosity build up in a time sweep rheology test (300° C., 10 rad/s, 1 hour) was used for samples 1 and 2 for those which do not contain UV stabilizer. As can be seen in Table 3, the resulting pellets exhibited a good quenching efficiency as compared to reference quenched material, fully validating our invention.

TABLE 3

| Test | Material | UV retention, % | Viscosity build-up, % |
|---|---|---|---|
| 1 | Reference (quenched) | (—) | 10 |
| 2 | Masterbatch 1 (neat) | (—) | 9 |
| 3 | Reference (quenched) | 85 | (—) |
| 4 | Masterbatch 2 (1X3) | 99 | (—) |
| 5 | Masterbatch 3 (LS2) | 92 | (—) |

What is claimed is:

1. A method for finishing polycarbonate produced by reaction in a melt of a diaryl carbonate and a dihydric phenol in the presence of a basic catalyst to produce an intermediate polycarbonate composition, comprising the steps of
   (a) combining the intermediate polycarbonate composition with a powder-free quenching composition comprising an acidic quencher in a non-powder carrier; and
   (b) processing the combination of the intermediate polycarbonate composition and the quenching composition to blend the compositions and quench residual basic catalyst present in the intermediate polycarbonate composition.

2. The method of claim 1, wherein the non-powder carrier is a liquid.

3. The method of claim 2, wherein the acidic quencher is an alkyl tosylate.

4. The method of claim 3, wherein the alkyl tosylate is n-butyl tosylate.

5. The method of claim 4, wherein the liquid carrier is propylene carbonate.

6. The method of claim 5, wherein the quenching composition contains about 4% n-butyl tosylate and 96% propylene carbonate.

7. The method of claim 1, wherein the non-powder carrier is a solid polycarbonate pellet.

8. The method of claim 7, wherein the solid polycarbonate pellet is a pellet formed by pre-compounding polycarbonate and the acidic quencher.

9. The method of claim 8, wherein the acidic quencher is an alkyl tosylate.

10. The method of claim 9, wherein the alkyl tosylate is n-butyl tosylate.

11. The method of claim 7, wherein the solid polycarbonate pellet is a pellet formed by compacting a mixture of powdered polycarbonate and the acidic quencher.

12. The method of claim 11, wherein the acidic quencher is an alkyl tosylate.

13. The method of claim 12, wherein the alkyl tosylate is n-butyl tosylate.

14. The method of claim 7, wherein the acidic quencher is coated onto the surface of a solid polycarbonate pellet.

15. The method of claim 14, wherein the acidic quencher is an alkyl tosylate.

16. The method of claim 15, wherein the alkyl tosylate is n-butyl tosylate.

17. A quencher pellet comprising an acidic quencher and polycarbonate, wherein the acidic quencher is present in an amount of at least 0.01% by weight.

18. The quencher pellet of claim 17, wherein the acidic quencher is present in an amount of at least 0.1% by weight.

19. The quencher pellet of claim 18, wherein the acidic quencher is dispersed within the polycarbonate.

20. The quencher pellet of claim 19, wherein the acidic quencher is an alkyl tosylate.

21. The quencher pellet of claim 20, wherein the alkyl tosylate is n-butyl tosylate.

22. The quencher pellet of claim 18, wherein the acidic quencher is disposed in a layer at the exterior of the pellet.

23. The quencher pellet of claim 22, wherein the acidic quencher is an alkyl tosylate.

24. The quencher pellet of claim 23, wherein the alkyl tosylate is n-butyl tosylate.

* * * * *